(12) United States Patent
Franceschini et al.

(10) Patent No.: US 8,004,884 B2
(45) Date of Patent: Aug. 23, 2011

(54) ITERATIVE WRITE PAUSING TECHNIQUES TO IMPROVE READ LATENCY OF MEMORY SYSTEMS

(75) Inventors: Michele M. Franceschini, Yorktown Heights, NY (US); Luis A. Lastras-Montano, Yorktown Heights, NY (US); Moinuddin K. Qureshi, Yorktown Heights, NY (US); Vijayalakshmi Srinivasan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 12/533,548

(22) Filed: Jul. 31, 2009

(65) Prior Publication Data

US 2011/0026318 A1    Feb. 3, 2011

(51) Int. Cl.
*G11C 11/00* (2006.01)
(52) U.S. Cl. .................................. 365/163; 365/189.16
(58) Field of Classification Search .................. 365/163, 365/113, 189.011, 189.16, 185.18
See application file for complete search history.

(56) References Cited

U.S. PATENT DOCUMENTS

| | | | |
|---|---|---|---|
| 5,436,913 A | 7/1995 | Yamamura et al. | |
| 5,559,988 A | 9/1996 | Durante et al. | |
| 5,708,605 A | 1/1998 | Sato | |
| 5,742,787 A | 4/1998 | Talreja | |
| 5,745,414 A * | 4/1998 | Engh et al. | 365/185.2 |
| 5,754,470 A * | 5/1998 | Engh et al. | 365/185.03 |
| 5,940,861 A | 8/1999 | Brown et al. | |
| 6,006,339 A | 12/1999 | McClure | |
| 7,349,245 B2 | 3/2008 | Kim et al. | |
| 7,426,138 B1 | 9/2008 | Wong | |
| 2004/0136258 A1 | 7/2004 | Ishikawa | |
| 2005/0268207 A1 | 12/2005 | Gallagher et al. | |
| 2008/0162393 A1* | 7/2008 | Iliff | 706/46 |
| 2009/0064129 A1 | 3/2009 | Chen et al. | |
| 2009/0067241 A1 | 3/2009 | Gorobets et al. | |
| 2009/0070521 A1 | 3/2009 | Gorobets et al. | |
| 2009/0070529 A1 | 3/2009 | Mee et al. | |
| 2009/0070748 A1 | 3/2009 | Lin et al. | |

FOREIGN PATENT DOCUMENTS

EP        0376285 B1    9/1994

* cited by examiner

*Primary Examiner* — Gene N. Auduong
(74) *Attorney, Agent, or Firm* — Cantor Colburn LLP; William J. Stock

(57) ABSTRACT

Iterative write pausing techniques to improve read latency of memory systems including memory systems with phase change memory (PCM) devices. A PCM device includes a plurality of memory locations and a mechanism for executing an iterative write to one or more of the memory locations in response to receiving a write command that includes data to be written. The executing includes initiating the iterative write, updating a state of the iterative write, pausing the iterative write including saving the state in response to receiving a pause command, and resuming the iterative write in response to receiving a resume command. The resuming is responsive to the saved state and to the data to be written.

25 Claims, 5 Drawing Sheets

ITERATIVE WRITE PAUSING TECHNIQUES TO IMPROVE READ LATENCY OF MEMORY SYSTEMS

BACKGROUND

This invention relates generally to computer memory, and more specifically, to write pausing and pre-empting techniques to improve read latency of memory systems.

Limited lifetime computer storage devices include, but are not limited to, flash memory (e.g., not-and or "NAND" flash memory, and not-or or "NOR" flash memory) and phase change memory (PCM). Limited lifetime memory technologies may benefit from iterative write techniques (commonly referred to as "write-and-verify") that are comprised of a sequence of write and read operations. Iterative write techniques may allow a controller for the memory to store a desired value with an increased accuracy, since the read operations offer a feedback mechanism that can be used to reduce errors in the writing process.

Many of the emerging non-volatile memory technologies (e.g., flash and PCM) have asymmetric latency for read and write requests. Servicing a write request typically takes four to sixteen times the amount of time that it takes to service a read request. When a write request is scheduled to a bank of such slow-to-write memory, the bank is busy until the write request is completed. If another read or write request arrives at the same bank after the write is scheduled, that request has to wait until the current request is serviced. Thus, the slow writes can increase contention and increase the effective latency for subsequent read and write requests. While increased latency due to contention can generally be tolerated for write requests by using buffers, the increased latency for a read request may have bigger impact on overall system performance because reads are often in a critical path of a program being executed.

SUMMARY

An exemplary embodiment is a phase change memory (PCM) device that includes a plurality of memory locations and a mechanism for executing an iterative write to one or more of the memory locations in response to receiving a write command that includes data to be written. The executing includes initiating the iterative write, updating a state of the iterative write, pausing the iterative write including saving the state in response to receiving a pause command, and resuming the iterative write in response to receiving a resume command. The resuming is responsive to the saved state and to the data to be written.

Another exemplary embodiment is a memory system that includes one or more PCM devices and a memory controller in communication with the memory devices. The PCM devices include a plurality of memory locations. The PCM devices also include a mechanism for executing iterative writes to the memory locations, for interrupting iterative writes that are executing, and for saving a state of any interrupted iterative writes. The memory controller includes a mechanism for requesting an interruption to an iterative write, where the requesting is responsive to an elapsed execution time of the iterative write.

A further exemplary embodiment is a computer implemented method for writing to memory. The method includes receiving a write command at a memory system. The write command includes data to be written and specifies a plurality of memory locations. An iterative write is executed to the memory locations in response to receiving the write command. The executing includes initiating the iterative write, updating a state of the iterative write, pausing the iterative write including saving the state in response to receiving a pause command, and resuming the iterative write in response to receiving a resume command. The resuming is responsive to the saved state and to the data to be written.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
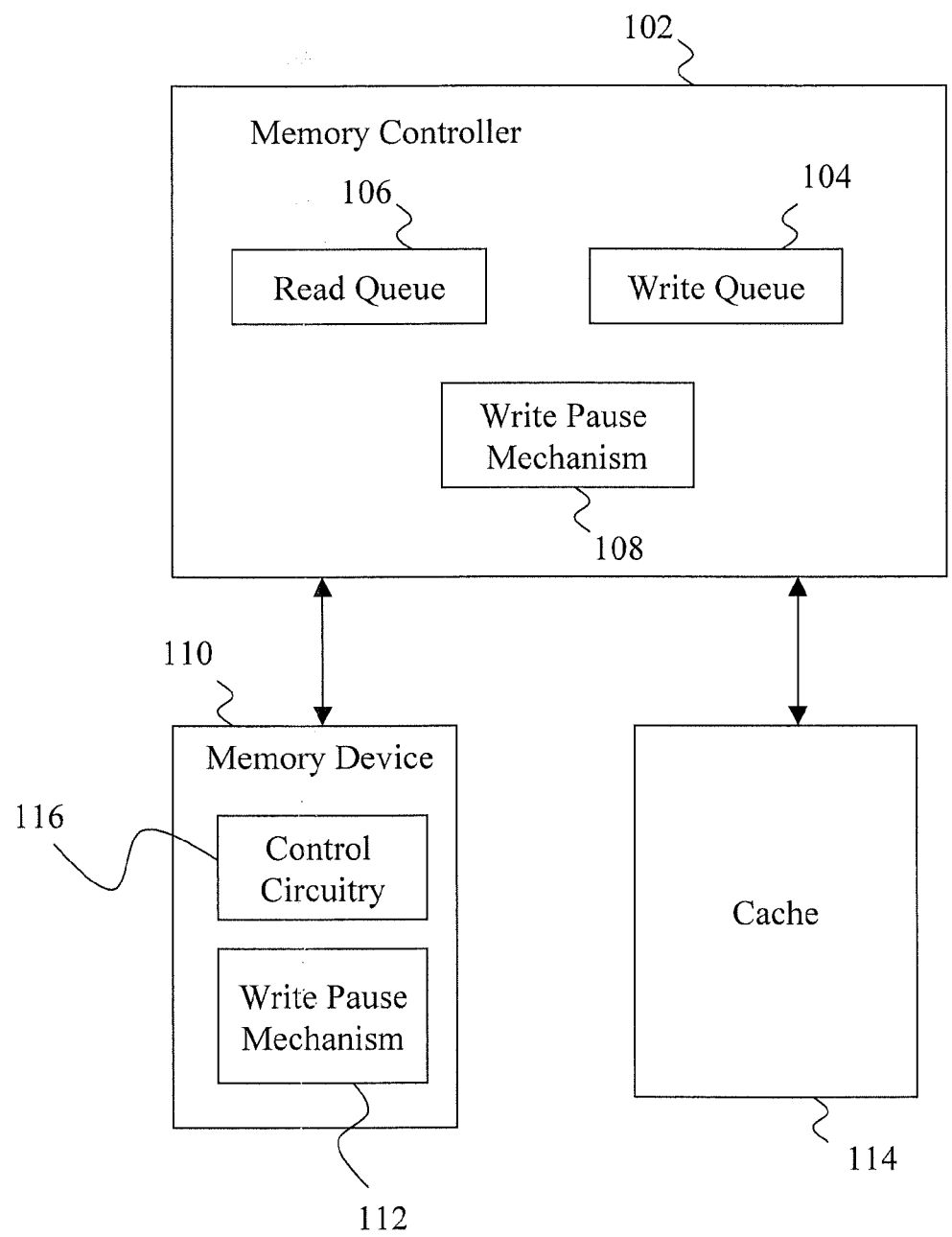
FIG. 1 illustrates a memory system that may be implemented by an exemplary embodiment.

Exemplary embodiments of the present invention are directed to write pausing and write-pre-empting techniques to improve read latency in memory systems.

An exemplary embodiment includes pre-empting an in-process write request when a read request is scheduled to a memory device (e.g., a phase change memory or "PCM" device) so that the effective read latency is improved. In an exemplary embodiment, the pre-empting is tunable in that writes that are almost finished are allowed to complete so that overhead associated with the write pre-empting (e.g., write-abort) is reduced. This approach improves the latency of read requests for a limited amount of overhead.

An exemplary embodiment also includes a write pausing process that can store the state of a current write request, service a pending read request, and then resume the paused write request at or close to the point where the write request was paused. Using write pausing avoids repeating the write service for the duration of the write that was already completed before the write request was paused. Thus, this approach avoids redundant service of write requests that were aborted to service pending read requests. In turn, this may improve read latency in a second order since continuing a paused write is expected to finish earlier than a restarted write.

An exemplary embodiment described herein is implemented using one or more PCM devices. As used herein the term "memory cell" refers to a physical entity that stores information and also provides for means of accessing this information. In an exemplary embodiment, a memory cell is comprised of a material that can change its physical state from amorphous to crystalline and vice versa by the application of suitable electrical signals. Also included in the cell is an access device such as, but not limited to, a diode or a transistor which is the means for stimulating electrically the material for write and read operations. As used herein, the term "memory location" may be interchanged with the term "memory cell". As used herein the term "array" refers to a collection of memory cells organized in bitlines and wordlines. The memory cells are located at the intersection of each bitline with each wordline, where an access device is used to stimulate the associated material in the memory cell via manipulation of the associated bitline and wordline. In exemplary embodiments, each programming pulse includes an adjustable pulse applied to the bit lines corresponding to some or all of the PCM memory locations to be programmed, and a pulse applied to the word line corresponding to the PCM memory locations to be programmed.

Exemplary embodiments utilize PCM memory devices that include a mechanism (e.g., circuitry) capable of applying an iterative write technique known in the art. One technique that may be utilized includes accepting contents to be written into specified PCM cells, obtaining the contents to be written to each of the specified PCM cells, and one or more repetitions of the following steps: apply a programming pulse; read the contents of the PCM cell; and determine if the contents of the PCM cells meet the stopping criteria.

To program a PCM cell with a desired resistance value, there exist a number of iterative writing algorithms. Often, a key feature of an iterative writing algorithm for PCM is the capability of progressively refining a model describing the PCM cell being programmed. Acquiring an accurate characterization of the PCM cell is a time-consuming task, which can involve a significant number of trial and error steps. Moreover, PCM cells exhibit a dynamic behavior due to phenomena such as resistance drift. As a consequence of the dynamic behavior of the PCM cells, the introduction of a write pausing and resuming capability creates a number of issues that are addressed by exemplary embodiments as described herein.

Resistance drift manifests itself as an increase of the PCM cell resistance, usually according to a power law as follows: $R \propto t^v$; where R denotes the PCM cell resistance, $\propto$ denotes proportionality, t denotes time elapsed since programming and v is a drift coefficient (usually less than one, dependent on the device technology). Interrupting and then resuming a write, either with an ABORT or a PAUSE command, in the presence of drift may lead to a number of issues. In particular, if the elapsed time between the first programming and the resume of the write operation is unknown, then the resistance of each PCM cell has changed in an unknown way. Exemplary embodiments described herein address this issue.

FIG. 1 illustrates a memory system that may be implemented by an exemplary embodiment. The memory system depicted in FIG. 1 includes a memory controller 102, one or more memory devices 110 (e.g., PCM memory devices) and a cache 114 (e.g., a DRAM cache). In an exemplary embodiment, the memory controller 102 is in communication with a processing system (e.g., a central processing unit or "CPU") to receive requests to access memory.

As depicted in FIG. 1, the memory devices 110 are connected to the memory controller 102 which acts as an interface between the processing system and the memory devices 110. Each memory device is capable of accepting commands, which are communicated via a bus connecting the memory controller 102 and the memory device 110. The memory device 110 illustrated in FIG. 1 interfaces to the memory controller 102 via a bus. The memory device 110 includes control circuitry 116 for decoding and executing commands received from the memory controller 102 and a memory device write pause mechanism 112. The memory device write pause mechanism 112 and the control circuitry 116 are implemented by a mechanism. As used herein, the term "mechanism" refers to any combination of hardware (e.g., circuitry), firmware and/or software instructions. In an exemplary embodiment the memory device write pause mechanism 112 is part of the control circuitry 116 and not separate from the control 116 as depicted in FIG. 1. As used herein, the term "circuitry" is one example of a mechanism that may be utilized to implement an exemplary embodiment.

The memory controller 102 illustrated in FIG. 1 includes a read queue 106 for storing pending read request, a write queue 104 for storing pending write requests, and a controller write pause mechanism 108 for determining when to issue and to process PAUSE, RESUME and ABORT commands. The controller write pause mechanism 108 is implemented by computer instructions. In an exemplary embodiment, the memory devices 110 support READ, WRITE, PAUSE, RESUME, and ABORT commands. The memory device 110, upon reception of a WRITE command performs an iterative write on the memory cells (e.g., PCM cells) to be programmed. In an exemplary embodiment, the circuitry responsible for performing the iterative writes (e.g., the control circuitry 116) is capable of storing and updating a state of the in-process write (including a state of the PCM) during the write process. In exemplary embodiments, upon reception of a PAUSE command, the state is saved in a dedicated memory in the memory device 110. In exemplary embodiments, the dedicated memory corresponds to the registers that store the state during the write operation. The contents of the dedicated memory are left unchanged until the WRITE is resumed, by means of a RESUME command.

The processing of the PAUSE command and restarting by the RESUME command is performed by a memory device write pause mechanism 112 in the memory device 110.

In an exemplary embodiment, such as the one depicted in FIG. 1, the memory system is a PCM based hybrid memory system. The read and write requests generated by the memory controller 102 are received by cache 114 (e.g., the DRAM cache). When the read request misses the cache 114 it is forwarded to the read queue 106 where it waits to get serviced (or while getting serviced). A read request may evict a "dirty" cache line from the cache 114 which must then be written to a memory device 110 (e.g., a PCM memory device implementing a PCM-based main memory). In an exemplary embodiment, this is performed by placing the "dirty" line in the write queue 104 where the data and request wait before getting written to the memory device 110.

FIG. 1 is intended to illustrate an example of one system that may be implemented by an exemplary embodiment. Any memory system configuration known in the art may be implemented by an exemplary embodiment as long as it includes the ability to implement the controller write pause mechanism 108 and the memory device write pause mechanism 112 described herein. For example, the read queue 106, write queue 104, and/or controller write pause mechanism 108 may be located on a memory module or hub device that is local to the memory device 110 and remote from the memory controller 102. In another alternate embodiment, the memory controller 102 is located in a processor.

Figure 2:
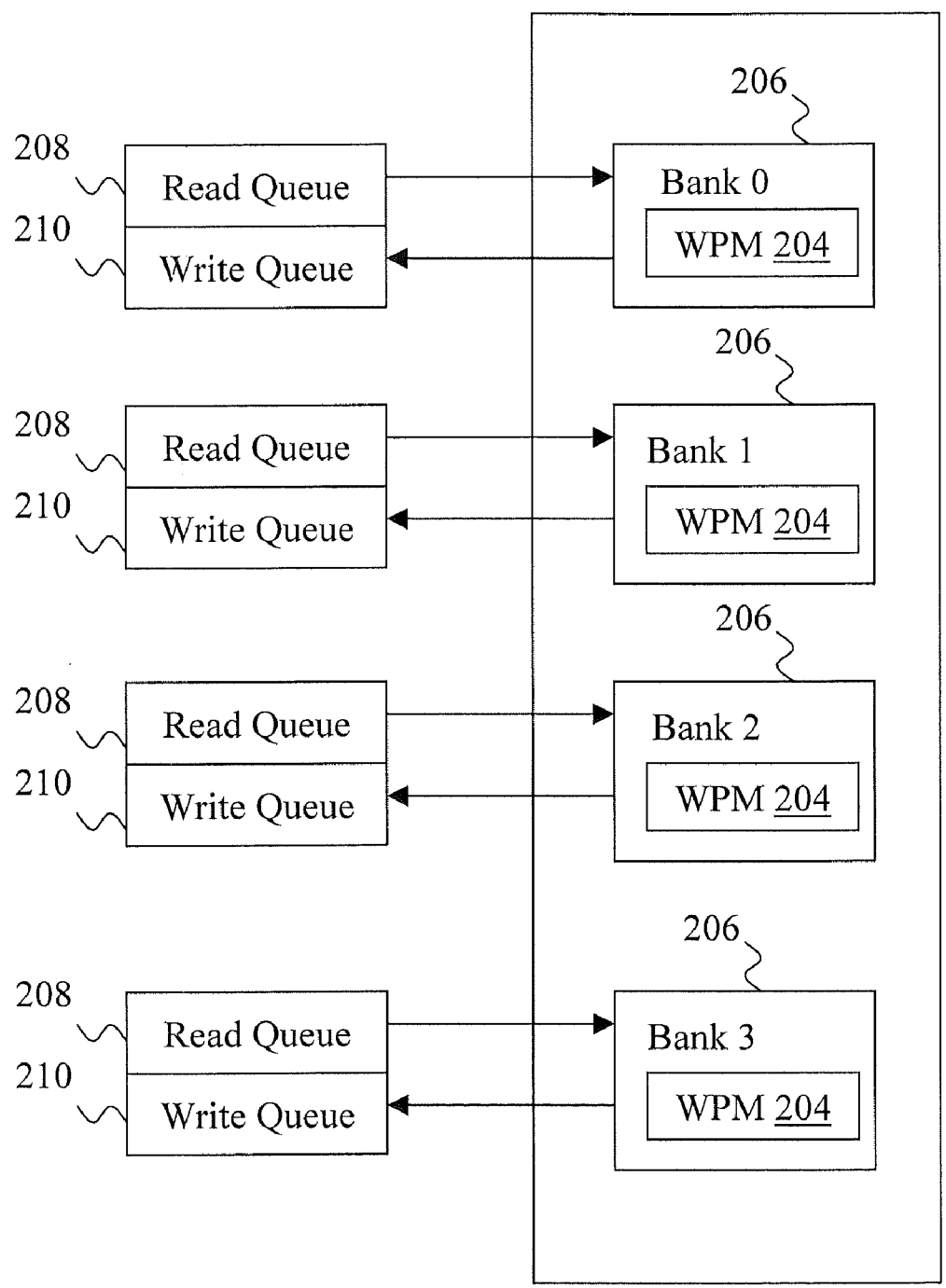
FIG. 2 illustrates a memory device that may be implemented by an exemplary embodiment.

FIG. 2 illustrates a more detailed memory device 202 (e.g., a PCM memory device) where the PCM memory device 202 is divided into four banks 206. Each bank is made up of memory locations implemented by memory cells and its own write pause mechanism 204. A memory cell is comprised of an access device and the phase change material that physically stores information. For simplicity each bank 206 is assumed to have its own read queue 208 and write queue 210.

When one of the queues associated with the bank 206 is empty and the other queue has a request, then that request is serviced by the PCM bank 206 if the bank is free. While a PCM bank 206 is servicing the request its status is set to busy. When both the read queue 208 and write queue 210 have entries, then a scheduling policy is utilized. One scheduling policy is an oldest first policy that selects the oldest request from both queues. If the oldest request happens to be a write request then this request may be serviced for thousands of cycles, and the pending read request may have to wait for that duration before getting serviced. Thus, write requests can significantly increase the latency of read requests.

A simple mechanism to reduce the read latency is to give preference to read requests over write requests. This approach is referred to as "read priority" (RDP) scheduling. When both the read queue 208 and the write queue 210 for a bank 206 are non-empty then RDP scheduling always selects the read request for service, unless the number of write requests in the write queue 210 exceed some threshold, in which case a write request is selected for service.

Even with RDP, a read request that arrives after a write request has been scheduled still has to wait until the write is finished. This latency can be avoided by: aborting the write request, setting the PCM bank status from busy to free, and scheduling the read request. Write aborts for requests that are close to completion can have an adverse impact on performance because some time later these write requests will have to be written to the memory device 202, thereby delaying future read requests. In exemplary embodiments, write aborts are controlled by a tunable (and programmable) parameter "K" referred to herein as a "write abort threshold". Write abort can be performed only if the write request has not finished more than K % of its expected service time. Write aborts may be avoided when the number of lines in the write queue 210 exceeds a certain threshold. When the service time is not deterministic, a factor times the expected service time may be used as a threshold for aborting writes. In another embodiment the write abort threshold is an adaptive threshold and may be a function of the number of entries in the write queue. If there are a small number of entries then a larger threshold can be used and vice versa. For example, the following function can be used to estimate the write abort threshold: Write abort threshold (%)=100−W*NumEntriesInWriteQueue; where W is a weight associated with write queue occupancy. W can be selected such that when the number of entries in the write queue is close to maximum then the write abort threshold reaches 0.

The write abort policy with controllable (e.g., adaptive, programmable) threshold still incurs the overhead of redoing the writes, which can cause increased power consumption and reduced device lifetime. The overhead of write abort can be avoided if the state of the in-process write (e.g., including a state of all or a subset of the PCM cells on the PCM device being written) can be stored so that when the write request is rescheduled it does not have to incur all of the write service cycles already performed before it was stopped. This is referred to herein as a "write pause" policy. In an exemplary embodiment, the write pause policy is implemented with iterative write schemes in PCM devices. In an exemplary embodiment, the state information is stored in the write queue 210 or in another location on the memory controller 102 or the memory device 110. An advantage of the write pause policy is the further reduction of the read latency by improving (i.e., reducing) the amount of time a bank is busy.

Figure 3:
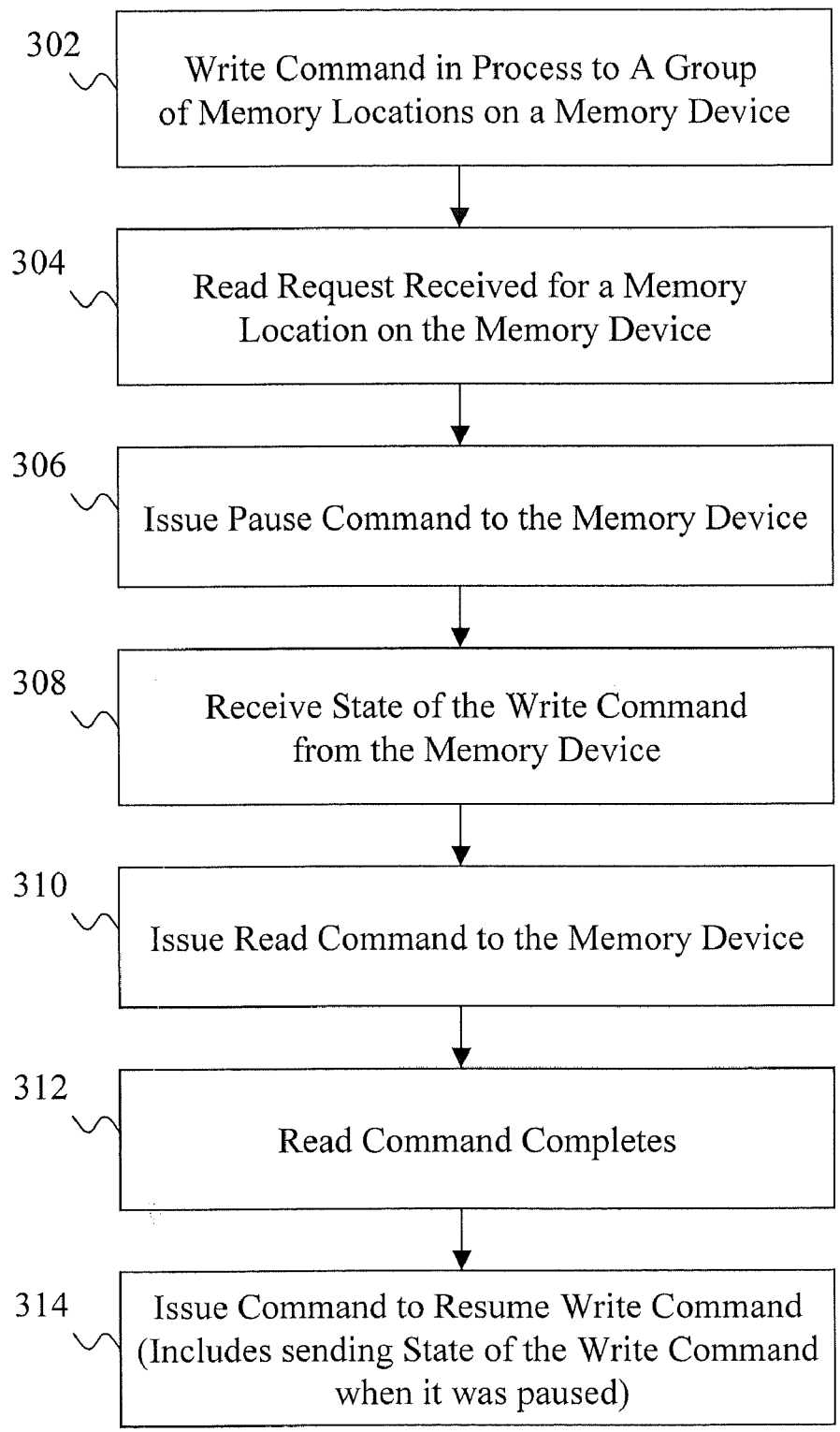
FIG. 3 illustrates a controller write pause process that may be implemented by an exemplary embodiment.

FIG. 3 illustrates a controller write pause process that may be implemented by an exemplary embodiment of a memory controller, such as memory controller 102. In an exemplary embodiment, the process depicted in FIG. 3 is implemented by the controller write pause mechanism 108 located on the memory controller 102. At block 302, a write command is in process to a group of memory locations on a memory device 110. A read request is received for the memory device 110 at block 304. In an exemplary embodiment, the memory controller 102 checks the read queue 106 to determine if there are any pending read requests. At block 306, the memory controller 102 issues a PAUSE command to the memory device 110 to pause the in-process write. A state of the in-process write command is received (and stored) at block 308. In an alternate exemplary embodiment, the state of the in-process write command is stored at the memory device 110. At block 310, the memory controller 102 issues a read command (e.g., the next read command in the read queue 106) to the memory device 110 and at block 312, the read command completes. The memory controller 102 performs block 314 and issues a RESUME command to RESUME the in-process write. If the state of the in-process write is stored on the memory controller 102, then the state is sent to the memory device 110. If the state of the in-process write is stored on the memory device 110, then the state is accessed by the memory device 110 in response to receiving the RESUME command from the memory controller 102. In an alternate exemplary embodiment, the processing described herein is extended to support a memory device having a plurality of read and write queues such as the embodiment depicted in FIG. 2.

Figure 4:
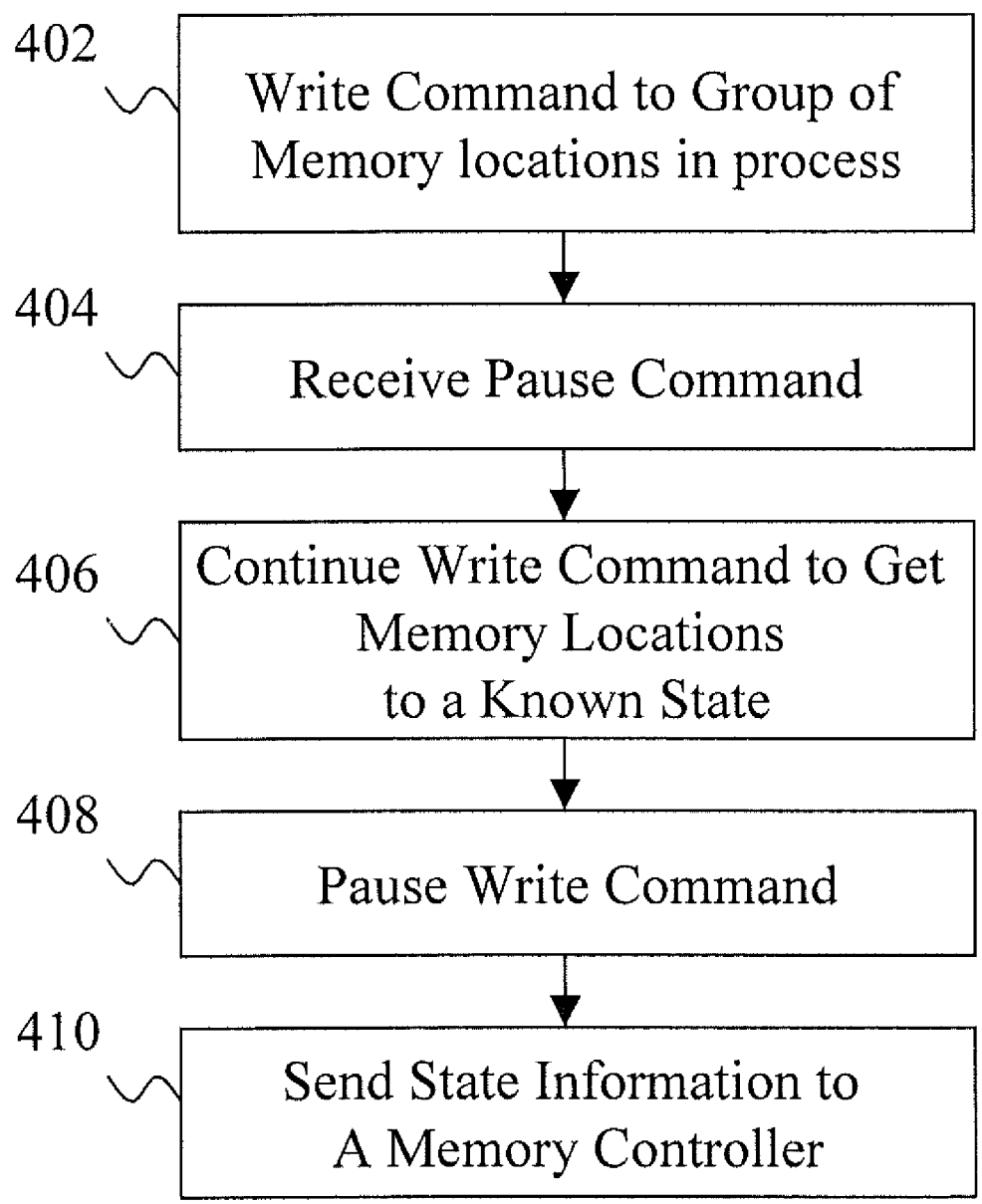
FIG. 4 illustrates a memory device pause process that may be implemented by an exemplary embodiment.

FIG. 4 illustrates a memory device pause process that may be implemented to pause an in-process write that may be utilized by an exemplary embodiment of a memory device, such as memory device 110. In an exemplary embodiment, the process depicted in FIG. 4 is implemented by the device write pause mechanism 112 located on the memory device 110. At block 402, a write command to a group of memory locations is in process at the memory device 110. The memory device 110 receives a command to pause the in-process write at block 404. At block 406, the memory device 110 determines when to pause the in-process write. In an exemplary embodiment, this includes getting the group of memory locations to a known state (e.g., waiting for the completion of a current write iteration). Example methods that may be utilized to perform this step for a PCM memory device are described herein. At block 408, the in-process write command is stopped. At block 410, the in-process write state information is sent to the memory controller 102. In an alternate exemplary embodiment, the state information is stored at the memory device 110

Exemplary embodiments include a PCM device 110 capable of performing iterative writes on groups of memory locations. The PCM memory device 110 accepts commands including READ, WRITE, PAUSE, and RESUME. In an exemplary embodiment, the circuitry responsible for the performing of the iterative writes is capable of storing and updating a state during the write process. Upon reception of a PAUSE command, the state is saved (e.g., if the state is saved within the device, it may then be saved in the same location where it is stored during the write operation) and left unchanged until the WRITE is resumed. Upon reception of a RESUME command, the iterative write circuitry is reinitialized using the stored state, and then the iterative write is restarted.

In an exemplary embodiment, the PCM device 110, upon completion of a WRITE or RESUME, stores timing information. This timing information is meant to be the time when the cells are available for a subsequent read. Upon a READ on the same group of memory locations, the device retrieves the timing information and prevents the read operation if the current time is less than the timing information. During the time in which the data is unavailable in PCM, the write data may be kept in the write queue which would service any subsequent reads until the written data becomes valid in the PCM.

Figure 5:
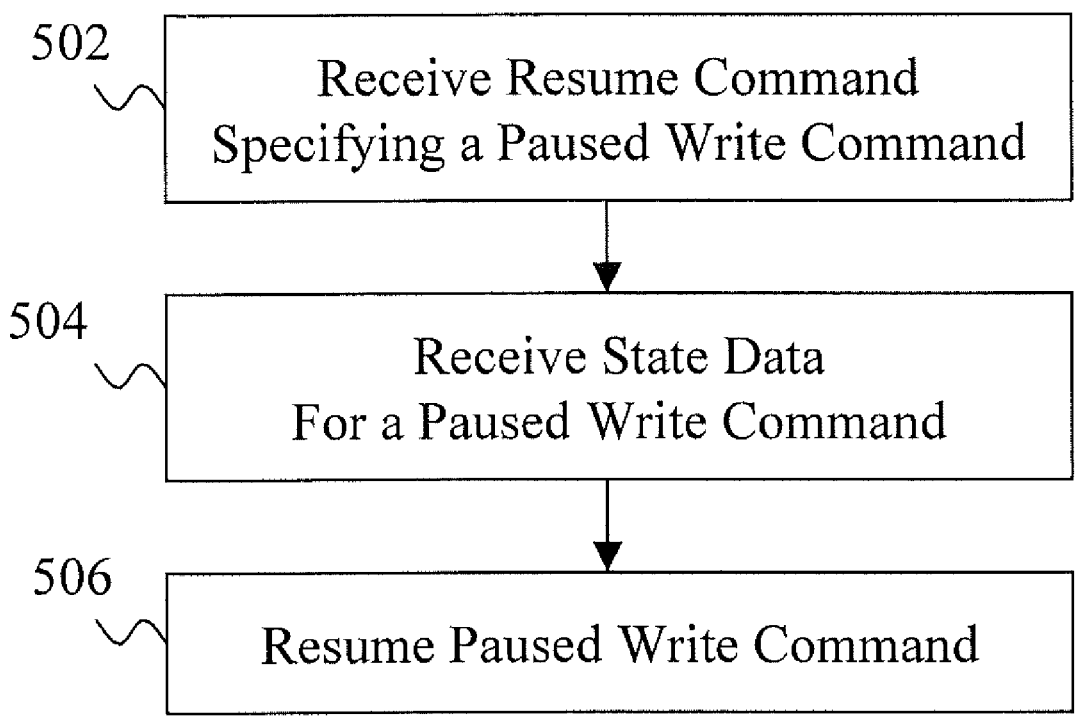
FIG. 5 illustrates a memory device pause process that may be implemented by an exemplary embodiment.

FIG. 5 illustrates a memory device pause process to resume an in-process write that may be implemented in an exemplary embodiment of a memory device, such as memory device 110. At block 502, the memory device 110 receives a RESUME command indicating that the in-process write should be resumed. At block 504, state data for the paused in-process write command is retrieved (from the memory controller 202, from the memory device 110, from the write queue 104, etc.). At block 506, the in-process write command is resumed using the state data.

In an exemplary embodiment, the PCM material in a PCM device is subject to a resistance drift process and upon the reception of a RESUME to each of the memory locations to be programmed a pulse that restarts the resistance drift process is applied.

In an exemplary embodiment, pulses used to program the PCM memory locations include melting pulses. A melting pulse can be obtained by ensuring that a high enough current passes through a PCM cell. Upon reception of a RESUME the write process at each of the memory locations to be programmed is restarted from the last applied melting pulse. As described herein in subsequent paragraphs, this can have the effect of simultaneously getting all the memory locations to a reasonably well known resistance state while simultaneously, restarting drift for all of them at the same time. This can be applied in at least two broad cases. In the first case, the iterative programming method only applies melting pulses. In the second case, the iterative programming method applies a combination of melting pulses and annealing pulses; annealing pulses are characterized by their functional outcome which is to reduce the size of existing amorphous PCM material in a cell.

In the case of cell programming methods in which only melting pulses are applied to the cell, the role of the iterative programming technique is to refine the parameters of a melting pulse so as to obtain a final resistance value in a desired range. These parameters might, in an embodiment, be the width and height of a rectangular voltage pulse applied to an access device in connection with the PCM cell. The last parameters may be kept storage as a result of the reception of a PAUSE command, and once a RESUME command is received, the same pulse that had already been applied is applied again. This has the effect of restarting cell resistance drift while at the same time, leaving the cell in a resistance value that would be very close to the cell state just prior to the arrival of the PAUSE command.

The case of cell programming methods which combine anneal pulses and melting pulses can be treated by building upon the earlier discussion. In this case, the last pulse applied may not have been a melting pulse, but rather an annealing pulse. In this case, the parameters of the last melting pulse are stored and upon the arrival of a PAUSE command, any further writing to that cell is stopped. Upon the reception of a RESUME command, the parameters of the last melting pulse are retrieved and the corresponding pulse is applied. Then the iterative write programming technique is continued as before, that is, a read follows the application of this melting pulse to determine the value of the resistance in the cell, and the iterative programming technique then continues as it was designed in the absence of the notion of a PAUSE scenario.

In an exemplary embodiment, whenever starting or resuming an iterative write operation, the write circuitry reads the contents of the cells being programmed. When done as part of the resume operation, this read gives to the iterative programming technique a fresh picture of the current state of the cell. In the case of a PCM cell architecture and iterative write technique in which resistance drift is not as significant an issue, then a read as the first action in a RESUME may be what is needed to restart the iterative write programming technique from a known state.

In exemplary embodiments, the iterative programming algorithm utilized to perform writes keeps track of a state, which allows estimating some parameters describing the PCM cell being programmed. The estimation of the PCM cell parameters can be responsible for most of the overall programming time. Exemplary embodiments therefore efficiently exploit the gathered information regarding the PCM location being programmed by storing it upon reception of a PAUSE command, and retrieving it upon reception of a RESUME command.

For example, a maximum likelihood algorithm based on a Gaussian approximation of the statistical response of the logarithm of the PCM cell resistance to a programming pulse may be implemented by an exemplary embodiment. In this algorithm a parameter $\theta_l$ representing the state of the programming algorithm is tracked and updated during the programming iterations. The algorithm includes a write signal selector circuitry computing a real valued parameter $x_{l+1}$ as follows: $x_{l+1} = R - \theta_l$, where R denotes the desired logarithmic resistance value, l is the iteration index, and $\theta_l$ is a parameter computed according to the following update rule:

$$\theta_{l+1} = \frac{\theta_l\left(l - 1 + \frac{\sigma_2}{\sigma_\theta^2}\right) + y_l - x_l}{l + \frac{\sigma_2}{\sigma_\theta^2}}$$

where $y_l$ is the logarithmic resistance value of the PCM cell at iteration l, and $\sigma$ and $\sigma_\theta$ are positive real valued parameters which describe the intrinsic noisiness of a PCM cell and the array variability of the PCM cells, respectively.

At each step, the value $x_{l+1}$ is used to compute the programming pulse to be applied through a function $f(.)$. The function $f(.)$ can be obtained as follows. Assuming that the programming circuitry is capable of applying a pulse among a family of possible pulses and that the pulse is selected through a value. By applying all available pulses, or a relevant subset of all available pulses, to a large sample of cells in the memory array, one can build an average relation $F(.)$ between the value describing the pulse and the average obtained logarithmic resistance. The function $f(.)$ is an inverse of the relation $F(.)$. Both $f(.)$ and $F(.)$ can be represented by a linear combination of functions, obtained, for example by fitting the data collected by applying the pulses to the memory array.

In exemplary embodiments, upon reception of a PAUSE command, the write controller (e.g., located on the memory device) stores the value l and the value $\theta_l$ for subsequent use upon reception of a RESUME command. Other exemplary embodiments use a progression of current pulses, each followed by a verify read step. The current magnitude of the pulse increases steadily with the number of pulses applied. In this case, the saved state could be the number of previously applied pulses, or, equivalently, the number of unsuccessful write iterations.

An exemplary embodiment addresses pause in a PCM memory system affected by resistance drift. If the programming scheme is not intrinsically unaffected by drift, after the PCM locations have been programmed, due to resistance drift, the value of the resistance of the PCM locations is known to change with time. One or more PAUSE commands received during a write operation may make it possible for two groups of PCM cells among those to be programmed with a WRITE command to be actually programmed at different times. To solve this problem an exemplary embodiment performs either of two actions. First, the resistance drift may be reinstated in order to equalize the apparent or real programming times of all the cells. Alternatively, a guard time may be imposed before a subsequent read, based on information on the memory at the WRITE, PAUSE and RESUME command reception time.

An exemplary embodiment includes a method based on reinstating the drift. It is well known that the melt/quench process necessary to generate amorphous phase in a phase change material produces amorphous material which exhibits resistance drift in agreement with the above given formula, with reference time (t=0) given by the epoch at which the molten material is quenched. Melting pulses, i.e., pulses that melt then quench the phase change material, are therefore expected to reinstate the drift process from the beginning.

In general, PCM programming schemes may or may not include non-melting pulses, however, they generally include melting pulses. To reinstate the drift, in exemplary embodiments, upon reception of a RESUME command, the write controller restarts the write on every cell to be programmed (including the ones that have already been programmed), and, where applicable, re-applies the last programming pulse applied to an cell. In exemplary embodiments, the iterative programming algorithm comprises melting pulses, also known as partial reset pulses, and non-melting annealing pulses, also known as partial set pulses. In exemplary embodiments, the programming restarts from the application of the last melting pulse applied to the memory location to be programmed.

In certain cases it is possible to reinstate resistance drift by applying special non-melting pulses immediately before reading, to improve PCM content retrieving. The same pulses can be used in a completely different context to reinstate drift after a PAUSE command. In exemplary embodiments, upon reception of a RESUME command, an intermediate pulse, which does not cause melting of the phase-change material in the PCM cell is applied to all PCM cells already programmed during a previous WRITE or RESUME command. Such pulse is known to reinstate a physical condition similar or equal to that one that causes resistance drift. The result is to have all PCM cells to look like they were programmed approximately at the same time.

Exemplary embodiments include a process based on the guard time. As above mentioned, one or more PAUSE commands received during a write operation may make it possible for two groups of PCM cells among those to be programmed with a WRITE command to be actually programmed at different times. In particular, the resistance $R_1$ of an cell programmed at time $t_1$ will drift according to $R_1 \propto (t-t_1)^v$ where "$\propto$" denotes proportionality and v is the drift coefficient. The resistance $R_2$ of an cell programmed at time $t_2$ will drift according to $R_2 \propto (t-t_2)^v$. If the two resistances were meant to be equal the relative error is given by $(R_1-R_2)/R_2=R_1/R_2-1=(t-t_1)^v/(t-t_2)^v-1$ which is approaching 0 as the time t increases.

If $t_1$ is the programming time at the WRITE command and $t_2$ is the programming time at the last RESUME command, by waiting enough time before a read the relative error can be made arbitrarily small. To this end, $t_1$ can be stored as a timestamp $t_{timestamp}$ at WRITE time and an absolute guard time can be computed as a function of the final RESUME programming time $t_{end}=t_2$. The timing information can be computed according to the following formula: timing information=$\min\{t>t_{end}:|(t-t_{timestamp})^v/(t-t_{end})^v-1|<\epsilon\}$; where $t_{timestamp}$ is the timestamp denoting the time of interruption of the write command, $t_{end}$ is the time at which the resume command is completed, v is the drift parameter described above, and $\epsilon$ is a precision parameter.

In exemplary embodiments, upon reception of an ABORT or a PAUSE command, the memory device stores a timestamp associated with the memory locations to be programmed (e.g., with the already programmed memory locations). This timestamp may be kept in a table separate from the PCM memory or could even be stored directly inside of the PCM by using a region that, for example, uses a single bit/cell which is significantly insensitive from drift and/or by protecting this region heavily using error correction codes. Alternatively or in addition to the above, this timing information is stored in the write queue, and the corresponding entry in the write queue is not deleted until that time has elapsed. In doing so, subsequent reads that arrive before the time has elapsed for the cell to be available for reading, can complete their read request by reading the data from the write queue, and not going to the PCM device.

In exemplary alternate embodiments, upon reception of an ABORT or a PAUSE command, the device stores a flag denoting that the programming has been interrupted, associated with the cells to be programmed.

In exemplary alternate embodiments, the iterative write algorithm consists of a sequence of write and verify steps. The PAUSE command may only be accepted upon the completion of the VERIFY step. Then in between the time the PAUSE was received and the subsequent RESUME is received, at the PCM, resistance drift may occur. Upon reception of the RESUME command, the iterative write algorithms is resumed as if the PAUSE/RESUME commands had not taken place, starting from the results of the last VERIFY step.

In exemplary embodiments when resuming a write, the write controller retrieves information denoting whether the in-process write being resumed has actually been previously interrupted. In exemplary embodiments, the information denoting the write being resumed having been previously interrupted is given by the presence of a flag. In exemplary embodiments, the information denoting the write being resumed has previously been interrupted is given by the presence of a timestamp.

In exemplary embodiments, upon completion of a RESUME command, timing information is computed based on the timestamp recovered when initiating the RESUME and on the time at which the RESUME operation is completed. The timing information represents the minimum system time at which the contents of the cells programmed during the WRITE and RESUME operations are allowed to be retrieved.

Upon reception of a READ command, the timing information corresponding with the memory locations to be read is retrieved and compared with the system time. If the system time is greater than the timing information, the read proceeds normally. In exemplary embodiments, when the system time is smaller than the timing information, the memory device waits until the system time is greater than the timing information. In exemplary embodiments, when the system time is smaller than the timing information, the memory device sends a signal to the memory controller indicating that temporarily the read cannot be performed.

Exemplary embodiments also address abort commands for drift insensitive programming. There exist PCM programming methods that significantly reduce resistance drift.

Among these methods is that of programming by creating amorphous material and then using short pulses to selectively anneal a polycrystalline path through the amorphous material. Another possible technique is that of applying, after a programming pulse, a short pulse whose role is that of accelerating drift, and therefore, from a practical standpoint, to lower drift speed after the application of said pulse.

Exemplary embodiments allow an effective ABORT of the write in schemes which use programming methods intrinsically insensitive to resistance drift. In these embodiments, the write circuitry performs a read and verifies if the contents of the PCM cells meet the stopping criteria, before the application of the first programming pulse. If the PCM cells meet the stopping criteria, then the PCM device is capable of accepting an ABORT command and upon reception of the ABORT command the control circuitry stops the write procedure. In an exemplary embodiment, upon reception of an ABORT command, the write procedure is terminated after the completion of the current write pulses. In possible implementations, upon reception of an ABORT command, the write procedure is terminated immediately after the decoding of the ABORT command.

Other exemplary embodiments support a pause when drift insensitive programming is utilized. In these embodiments, the write circuitry performs a read and verifies if the contents of the PCM cells meet the stopping criteria, before the application of the first programming pulse. If the contents of the PCM cells meet the stopping criteria then the PCM device is capable of accepting a PAUSE command and upon reception of the PAUSE command the control circuitry stops the write procedure. The control circuitry saves the state of the programming in a set of registers, which may be the same registers that are used by the control circuitry to keep track of the state of the programming procedure (e.g., the state of the PCM cell or in-process write command).

In exemplary embodiments, the state of a PCM cell is given by a digital representation of the ratio between a voltage applied to the PCM cell and the current flowing through the cell. In other exemplary embodiments, the state is formed by the number of pulses already applied to the PCM cell and a flag bit which stores the convergence status (i.e., converged or not converged).

Technical effects and benefits include the ability to pause in-process write commands to allow read commands to be processed without having to wait for the in-process write command to be completed. The in-process write command can then be resumed at the same point at or at a point close to where the write command was paused. This ability to pause write commands may lead to improved performance and throughput in a memory system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A phase change memory (PCM) device comprising:
a plurality of PCM memory locations; and
a mechanism for executing an iterative write to one or more of the memory locations in response to receiving a write command including data to be written, the executing comprising:
initiating the iterative write;
updating a state of the iterative write;
pausing the iterative write including saving the state in response to receiving a pause command; and
resuming the iterative write in response to receiving a resume command, the resuming responsive to the saved state and to the data to be written.

2. The memory device of claim 1, wherein the resuming comprises:
retrieving the data to be written;
retrieving the saved state;
reinitializing the mechanism for executing the iterative write responsive to the retrieved state and to the data to be written; and
restarting the iterative write.

3. The memory device of claim 2, wherein the iterative write includes applying one or more pulses to program a memory location.

4. The memory device of claim 3, wherein the pulses comprise melting pulses and the state includes parameters of the last applied melting pulse.

5. The memory device of claim 3, wherein the pulses comprise melting pulses and wherein the resuming includes restarting the iterative write from the last applied melting pulse at each of the memory locations being programmed by the write command.

6. The memory device of claim 1, wherein the state is comprised of one or more of (a) a set of parameters describing a model for each memory location being programmed by the write command, (b) a counter of the number of iterations applied to each memory location being programmed by the write command, (c) a timestamp indicating the time of a last applied programming pulse to each memory location being programmed by the write command, and (d) a value of a read resistance of each memory location being programmed by the write command.

7. The memory device of claim 1, wherein the iterative write includes a verify step after an application of a programming pulse, and wherein the pausing takes effect after the verify step.

8. The memory device of claim 1, wherein the mechanism further stores timing information in response to the completion of the iterative write and wherein a subsequent read operation to the one or more memory locations being programmed by the write command is prevented if the time of the subsequent read operation is less than the timing information.

9. The memory device of claim 1, wherein the memory locations are subject to a resistance drift process and wherein the mechanism further causes a pulse to be applied to each of the memory locations being programmed by the write command to restart the resistance drift process in response to receiving the resume command.

10. The memory device of claim 1, wherein restarting the iterative write includes reading contents of the memory locations being programmed by the write command.

11. A memory system comprising:
one or more phase change memory (PCM) devices comprising:
a plurality of memory locations; and
a mechanism for executing iterative writes to the memory locations, for interrupting iterative writes that are executing, and for saving a state of any interrupted iterative writes; and
a memory controller in communication with the memory devices and comprising a mechanism for requesting an interruption to an iterative write, the requesting responsive to an elapsed execution time of the iterative write.

12. The memory system of claim 11, wherein the memory controller stores a programmable threshold and wherein the interruption is requested if the elapsed execution time is less than the threshold.

13. The memory system of claim 11, further comprising a write queue for storing pending write commands and wherein the requesting is further responsive to the number of pending write commands.

14. The memory system of claim 13, wherein the memory controller stores an adaptive threshold that is responsive to the number of pending write commands and wherein the interruption is requested if the elapsed execution time is less than the adaptive threshold.

15. The memory system of claim 11, wherein the interruption requested is an abort.

16. The memory system of claim 11, wherein the interruption requested is a pause.

17. A computer implemented method for writing to memory, the method comprising:
   receiving a write command at a memory system, the write command including data to be written and specifying a plurality of memory locations; and
   executing an iterative write to the memory locations in response to receiving the write command, the executing comprising:
      initiating the iterative write;
      updating a state of the iterative write;
      pausing the iterative write including saving the state in response to receiving a pause command; and
      resuming the iterative write in response to receiving a resume command, the resuming responsive to the saved state and to the data to be written.

18. The method of claim 17, wherein the resuming comprises:
   retrieving the data to be written;
   retrieving the saved state;
   reinitializing the mechanism for executing the iterative write responsive to the retrieved state and to the data to be written; and
   restarting the iterative write.

19. The method of claim 17, wherein the memory system is a phase change memory (PCM) device and the iterative write includes applying one or more pulses to program a memory location.

20. The method of claim 19, wherein the pulses comprise melting pulses and the state includes parameters of the last applied melting pulse.

21. The method of claim 19, wherein the pulses comprise melting pulses and wherein the resuming includes restarting the iterative write from the last applied melting pulse at each of the memory locations being programmed by the write command.

22. The method of claim 17, wherein the state is comprised of one or more of (a) a set of parameters describing a model for each memory location being programmed by the write command, (b) a counter of the number of iterations applied to each memory location being programmed by the write command, (c) a timestamp indicating the time of a last applied programming pulse to each memory location being programmed by the write command, and (d) a value of a read resistance of each memory location being programmed by the write command.

23. The method of claim 17, wherein the iterative write includes a verify step after an application of a programming pulse and wherein the pausing takes effect after the verify step.

24. The method of claim 17, wherein the executing further comprises storing timing information in response to the completion of the iterative write and wherein a subsequent read operation to the one or more memory locations being programmed by the write command is prevented if the time of the subsequent read operation is less than the timing information.

25. The method of claim 17, wherein the memory locations are subject to a resistance drift process and wherein the executing further comprises causing a pulse to be applied to each of the memory locations being programmed by the write command to restart the resistance drift process in response to receiving the resume command.

* * * * *